US012658061B2

(12) United States Patent
Yoneda et al.

(10) Patent No.: US 12,658,061 B2
(45) Date of Patent: Jun. 16, 2026

(54) CONTROL APPARATUS, AIRCRAFT CONTROL METHOD, AND NON-TRANSITORY COMPUTER-READABLE MEDIUM

(71) Applicants: NEC Corporation, Tokyo (JP); NEC Networks & System Integration Corporation, Tokyo (JP); NEC Nexsolutions, Ltd., Tokyo (JP)

(72) Inventors: Yuki Yoneda, Tokyo (JP); Iori Yamaki, Tokyo (JP); Nanami Yamamoto, Tokyo (JP); Masahiro Kawazoe, Tokyo (JP)

(73) Assignees: NEC CORPORATION, Tokyo (JP); NEC Networks & System Integration Corporation, Tokyo (JP); NEC Nexsolutions, Ltd., Tokyo (JP)

( * ) Notice: Subject to any disclaimer, the term of this patent is extended or adjusted under 35 U.S.C. 154(b) by 167 days.

(21) Appl. No.: 18/283,104

(22) PCT Filed: Mar. 22, 2021

(86) PCT No.: PCT/JP2021/011708
§ 371 (c)(1),
(2) Date: Sep. 20, 2023

(87) PCT Pub. No.: WO2022/201245
PCT Pub. Date: Sep. 29, 2022

(65) Prior Publication Data
US 2024/0169847 A1      May 23, 2024

(51) Int. Cl.
*G08G 5/50*          (2025.01)
*B60L 58/12*         (2019.01)
*G08G 5/55*          (2025.01)

(52) U.S. Cl.
CPC ................ *G08G 5/50* (2025.01); *B60L 58/12* (2019.02); *G08G 5/55* (2025.01); *B60L 2200/10* (2013.01)

(58) Field of Classification Search
CPC .. B60L 2260/50; B60L 58/12; B60L 2260/54; B60L 2260/52; B60L 2200/10;
(Continued)

(56)          References Cited

U.S. PATENT DOCUMENTS 7,477,309 B2 *   1/2009   Cuccias ............... H04N 23/125
                                                      348/370
9,586,694 B2 *   3/2017   Suokas .................. B64D 45/04
(Continued)

FOREIGN PATENT DOCUMENTS

EP          2253935 A1 * 11/2010   ............... G08G 5/54
JP        2005-304560 A   11/2005
(Continued)

OTHER PUBLICATIONS

JP-2021018085-A machine translation (Year: 2021).*
(Continued)

*Primary Examiner* — Fadey S. Jabr
*Assistant Examiner* — Mark Robert Heim
(74) *Attorney, Agent, or Firm* — Sughrue Mion, PLLC

(57)          ABSTRACT

A control apparatus includes a decision unit, a destination point determination unit, and an aircraft control unit. The decision unit decides, when an aircraft flies by using a battery unit as a power source, whether a remaining quantity of the battery unit is equal to or less than a reference value. The destination point determination unit estimates, when it is decided that the remaining quantity of the battery unit is equal to or less than the reference value, a location where a light quantity is equal to or more than a reference by using information from various types of sensors mounted on the
(Continued)

aircraft. Then, the destination point determination unit determines, as a destination point of the aircraft, the estimated location. The aircraft control unit controls a mechanism of the aircraft so as to move the aircraft to the destination point determined by the destination point determination unit.

10 Claims, 5 Drawing Sheets

(58) Field of Classification Search
CPC ............ B60W 2510/244; H02J 7/0048; H02J 2300/24; H02J 2300/22; G08G 5/57; G08G 5/00; G08G 5/50; G08G 5/55; G01C 21/3453; G01C 21/3469; G01C 21/3461; G01C 21/3407; G01C 21/34; B64U 50/31; Y02E 10/50; Y02B 10/10; Y02A 20/142
See application file for complete search history.

(56) References Cited

U.S. PATENT DOCUMENTS

| | | | | |
|---|---|---|---|---|
| 11,133,684 B1 * | 9/2021 | Maurer | .................. | B64U 80/25 |
| 11,381,760 B2 * | 7/2022 | Scholtz | .................. | G02B 5/208 |
| 11,964,775 B2 * | 4/2024 | Akanuma | ................ | G08G 5/54 |
| 2005/0084975 A1 * | 4/2005 | Armentrout | ............. | B64F 1/20 |
| | | | | 436/56 |
| 2005/0234594 A1 * | 10/2005 | Uehigashi | ............... | A47L 9/009 |
| | | | | 318/568.12 |
| 2008/0099678 A1 * | 5/2008 | Johnson | .................... | G01J 5/02 |
| | | | | 250/332 |
| 2015/0339931 A1 * | 11/2015 | Yu | ........................... | G08G 5/53 |
| | | | | 701/122 |
| 2016/0027313 A1 * | 1/2016 | Loussides | ................ | G08G 5/55 |
| | | | | 701/16 |
| 2017/0225781 A1 * | 8/2017 | Almasoud | ................ | G08G 5/21 |
| 2020/0202727 A1 * | 6/2020 | Gandiga | .................. | G08G 5/21 |
| 2020/0393259 A1 * | 12/2020 | Gantt, Jr. | ................ | B60L 53/65 |
| 2022/0339983 A1 * | 10/2022 | Wurden | .................. | B64D 9/00 |
| 2023/0360247 A1 * | 11/2023 | Chew | ..................... | H04N 23/11 |

FOREIGN PATENT DOCUMENTS

| | | | | | | |
|---|---|---|---|---|---|---|
| JP | 2009008489 A | * | 1/2009 | | | |
| JP | 2017-017768 A | | 1/2017 | | | |
| JP | 2018-052341 A | | 4/2018 | | | |
| JP | 2018-055463 A | | 4/2018 | | | |
| JP | 2018078677 A | * | 5/2018 | | | |
| JP | 2020021357 A | * | 2/2020 | ............. | G05D 1/101 | |
| JP | 2020024103 A | * | 2/2020 | ........... | G01J 1/0219 | |
| JP | 2021018085 A | * | 2/2021 | | | |
| WO | WO-2017009471 A1 | * | 1/2017 | ............. | B64D 45/04 | |
| WO | WO-2020005163 A1 | * | 1/2020 | | | |

OTHER PUBLICATIONS

JP 2009008489 A machine translation (Year: 2009).*
JP 2018078677 A machine translation (Year: 2018).*
JP 2020021357 A machine translation (Year: 2020).*
JP-2020024103-A machine translation (Year: 2020).*
EP-2253935-A1 machine translation (Year: 2010).*
WO-2017009471-A1 machine translation (Year: 2017).*
International Search Report for PCT Application No. PCT/JP2021/011708, mailed on Jun. 1, 2021.
JP Office Communication for JP Application No. 2023-508166, mailed on Nov. 5, 2024 with English Translation.

* cited by examiner

FIG. 4                                                                    120
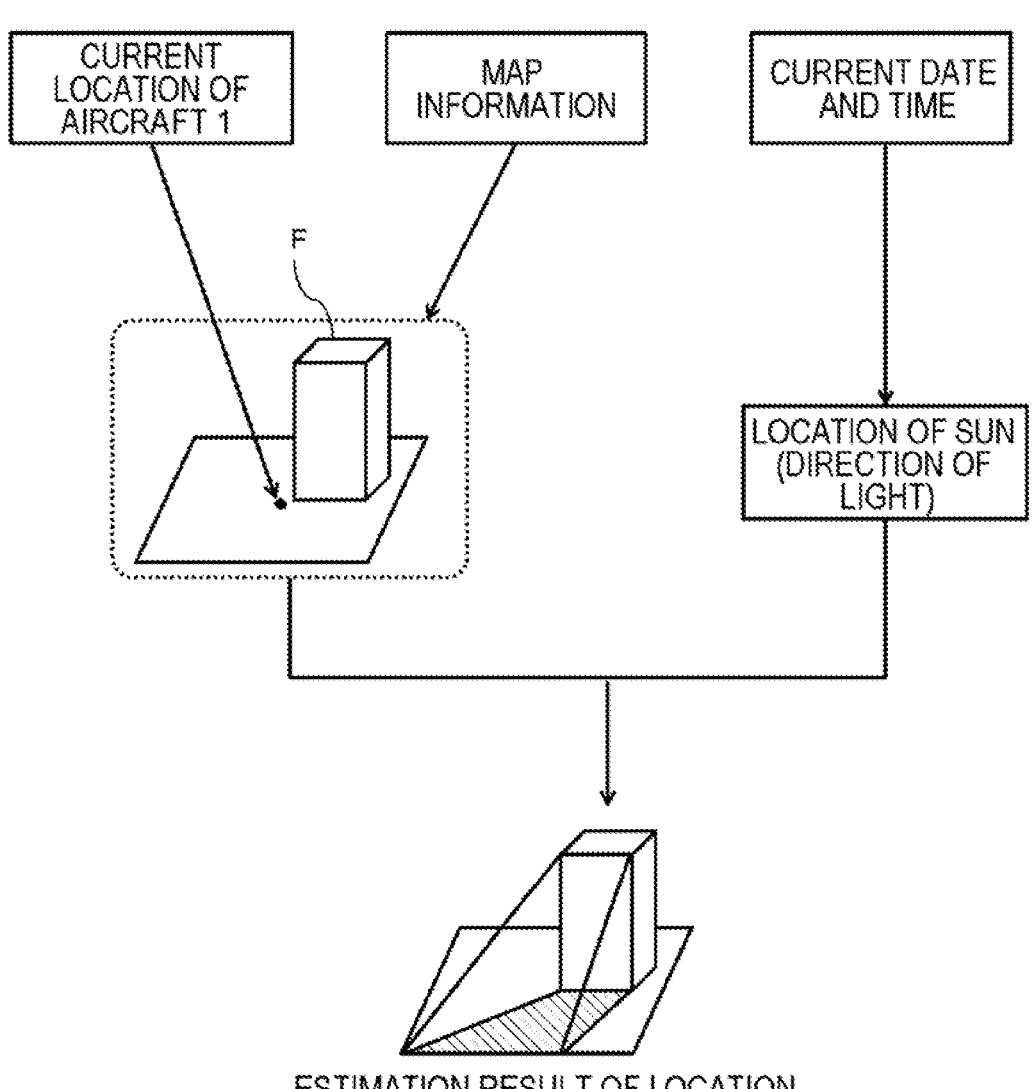
ESTIMATION RESULT OF LOCATION
WHERE LIGHT QUANTITY IS EQUAL
TO OR MORE THAN REFERENCE

FIG. 5

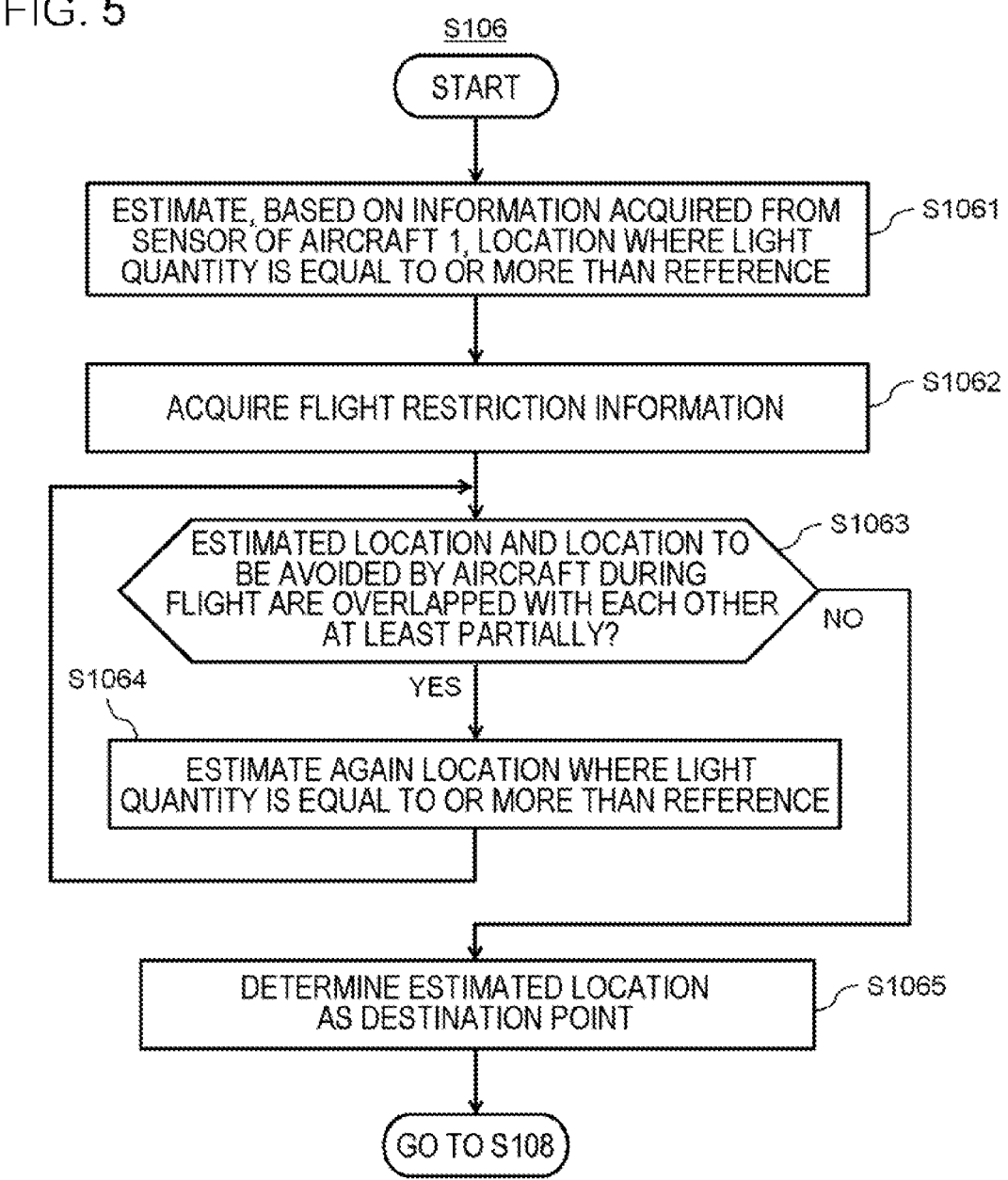

S106

START

↓

ESTIMATE, BASED ON INFORMATION ACQUIRED FROM SENSOR OF AIRCRAFT 1, LOCATION WHERE LIGHT QUANTITY IS EQUAL TO OR MORE THAN REFERENCE — S1061

↓

ACQUIRE FLIGHT RESTRICTION INFORMATION — S1062

↓

ESTIMATED LOCATION AND LOCATION TO BE AVOIDED BY AIRCRAFT DURING FLIGHT ARE OVERLAPPED WITH EACH OTHER AT LEAST PARTIALLY? — S1063     NO

YES ↓

ESTIMATE AGAIN LOCATION WHERE LIGHT QUANTITY IS EQUAL TO OR MORE THAN REFERENCE — S1064

↓

DETERMINE ESTIMATED LOCATION AS DESTINATION POINT — S1065

↓

GO TO S108

CONTROL APPARATUS, AIRCRAFT CONTROL METHOD, AND NON-TRANSITORY COMPUTER-READABLE MEDIUM

This application is a National Stage Entry of PCT/JP2021/011708 filed on Mar. 22, 2021, the contents of all of which are incorporated herein by reference, in their entirety.

TECHNICAL FIELD

The present invention relates to a technique for controlling behavior of an unmanned aircraft.

BACKGROUND ART

In a logistics field, a technique for delivering an article by using, instead of a person, an unmanned aircraft such as a drone has been studied. One example of a technique relating to flight control of such an unmanned aircraft is disclosed in Patent Documents 1 to 3 described below.

Following Patent Document 1 discloses a marine search system using an unmanned aircraft. Patent Document 1 discloses a technique for controlling an unmanned aircraft in such a way that, when a remaining quantity of a battery of an unmanned aircraft falls below a threshold, the unmanned aircraft lands on a takeoff and landing platform set in a buoy closest from a location of the unmanned aircraft.

Following Patent Document 2 discloses a technique for preventing battery exhaustion of a flying robot as much as possible during flight. Patent Document 2 discloses a technique for setting, when a remaining quantity of a battery of a flying robot is less than a predetermined threshold, a mode of executing an operation in which the flying robot returns to a predetermined charging point present in a location reachable by the flying robot on its own, and causing the flying robot to be headed to the charging point.

Following Patent Document 3 discloses a technique for preventing battery exhaustion of a flying robot as much as possible during flight. Patent Document 3 discloses a technique, based on an ambient wind velocity of a flying robot and a remaining quantity of a battery, for continuing flight on a previously-set route, or computing another route where battery consumption is small and setting a new flight route. Further, Patent Document 3 discloses a technique for cancelling, when a state where a wind velocity is equal to or more than a reference value continues for a predetermined time, flight of a flying robot, and causing the flying robot to land on the location.

RELATED DOCUMENT

Patent Document

Patent Document 1: Japanese Patent Application Publication No. 2020-21357
Patent Document 2: Japanese Patent Application Publication No. 2018-55463
Patent Document 3: Japanese Patent Application Publication No. 2018-52341

SUMMARY OF INVENTION

Technical Problem

An unmanned aircraft causes a thrust generation apparatus to drive by mainly using a battery as a power source, and thereby, flies. When electric energy accumulated in a battery being a power source is exhausted or decreased to a large extent, a sufficient lift force is not acquired, and therefore it may be difficult for an aircraft to maintain altitude. In particular, when a sufficient lift force is not acquired during delivery of an article and then altitude is lowered, the article being delivered may be damaged due to contact with a ground surface or the like.

In view of the problem described above, the present invention has been made. One object of the present invention is to provide a technique for stably supplying, when an article is delivered by using an aircraft, electric power to the aircraft.

Solution to Problem

A control apparatus according to the present disclosure is a control apparatus for an aircraft including, as a power source, a battery and a photovoltaic apparatus, the control apparatus including:

a decision unit that decides, when the aircraft flies by using the battery as a power source, whether a remaining quantity of the battery is equal to or less than a reference value;

a destination point determination unit that estimates, when it is decided that the remaining quantity of the battery is equal to or less than the reference value, a location where a light quantity is equal to or more than a reference by using information from a sensor mounted on the aircraft, and determines, as a destination point, the estimated location; and an aircraft control unit that controls a mechanism of the aircraft so as to move the aircraft to the destination point.

An aircraft control method according to the present disclosure includes, by a computer mounted on an aircraft including, as a power source, a battery and a photovoltaic apparatus:

deciding, when the aircraft flies by using the battery as a power source, whether a remaining quantity of the battery is equal to or less than a reference value;

estimating, when it is decided that the remaining quantity of the battery is equal to or less than the reference value, a location where a light quantity is equal to or more than a reference by using information from a sensor mounted on the aircraft, and determining, as a destination point, the estimated location; and controlling a mechanism of the aircraft so as to move the aircraft to the destination point.

A program according to the present disclosure for causing a computer mounted on an aircraft including, as a power source, a battery and a photovoltaic apparatus to function as:

a decision unit that decides, when the aircraft flies by using the battery as a power source, whether a remaining quantity of the battery is equal to or less than a reference value;

a destination point determination unit that estimates, when it is decided that the remaining quantity of the battery is equal to or less than the reference value, a location where a light quantity is equal to or more than a reference by using information from a sensor mounted on the aircraft, and determines, as a destination point, the estimated location; and an aircraft control unit that controls a mechanism of the aircraft so as to move the aircraft to the destination point.

Advantageous Effects of Invention

According to the present invention, when an article is delivered by using an aircraft, electric power can be stably supplied to the aircraft.

BRIEF DESCRIPTION OF THE DRAWINGS

FIG. 4 It is a diagram illustrating an operation example of a destination point determination unit.

FIG. 5 It is a flowchart illustrating a flow of processing of determining a destination point, the processing being executed by a destination point determination unit according to a second example embodiment.

DESCRIPTION OF EMBODIMENTS

Hereinafter, example embodiments according to the present invention are described by using the accompanying drawings. Note that, in all drawings, a similar component is assigned with a similar reference sign, and thereby description thereof will not be repeated, as appropriate. Further, unless otherwise specified, in each block diagram, each block represents not a configuration of a hardware unit but a configuration of a function unit. Further, when, in a figure, an arrow is present, a direction of the arrow is used merely for comprehensibly indicating a flow of information, and does not limit a direction (one direction/both directions) of communication unless otherwise specified.

First Example Embodiment

Figure 1:
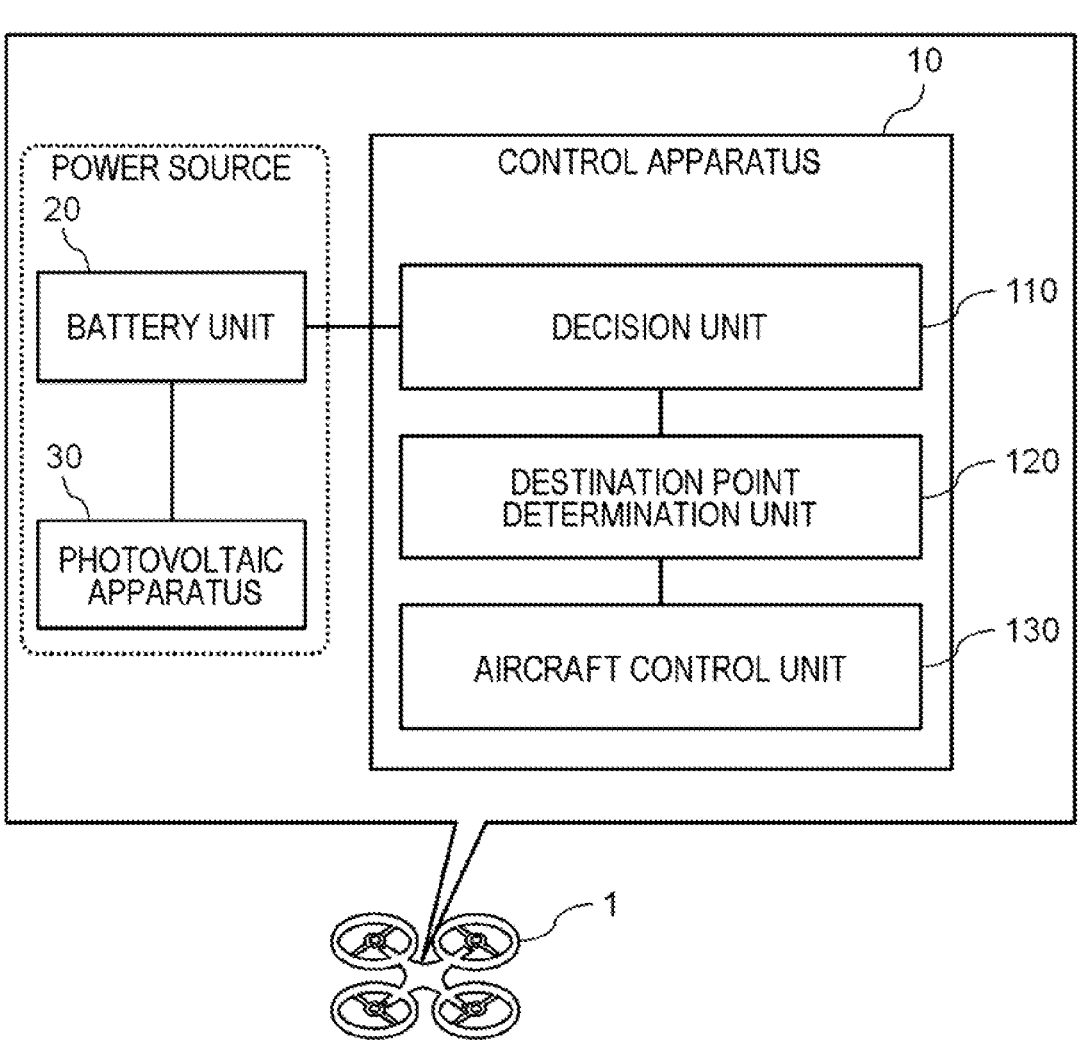
FIG. 1 It is a diagram illustrating a configuration example of an aircraft.

FIG. 1 is a diagram illustrating a configuration example of an aircraft 1. As illustrated in FIG. 1, a control apparatus 10 includes, as a power source, a battery unit 20 and a photovoltaic apparatus 30. Note that, while not illustrated in FIG. 1, the aircraft 1 further includes other components (various types of sensors, a radio transceiver, a power motor, a propeller, a flight controller, and the like) used for autonomous flight. Further, the aircraft 1 includes the control apparatus 10 including a function to be described later. Note that, the control apparatus 10 may double as a function as the above-described flight controller.

Function Configuration Example of Control Apparatus 10

The control apparatus 10 illustrated in FIG. 1 includes a decision unit 110, a destination point determination unit 120, and an aircraft control unit 130. The decision unit 110 monitors, when the aircraft 1 flies by using the battery unit 20 as a power source, a remaining quantity of the battery unit 20. As a result of monitoring based on the decision unit 110, when it is decided that the remaining quantity of the battery unit 20 is equal to or less than a predetermined reference value, the destination point determination unit 120 estimates, by using information from various types of sensors mounted on the aircraft 1, a location where a light quantity is equal to or more than a reference within a detection range of each of the sensors. Then, the destination point determination unit 120 determines, as a temporary destination point, a location estimated as the "location where a light quantity is equal to or more than a reference". When the temporary destination point is set by the destination point determination unit 120, the aircraft control unit 130 controls a mechanism such as a power motor mounted on the aircraft 1 to move the aircraft 1 toward the set destination point.

Hardware Configuration Example of Control Apparatus 10

Each function configuration unit of the control apparatus 10 may be achieved by hardware (e.g., a hard-wired electronic circuit) for achieving each function configuration unit, or may be achieved by a combination of hardware and software (e.g., a combination of an electronic circuit and a program for controlling the circuit). Hereinafter, a case where each function configuration unit of the control apparatus 10 is achieved by a combination of hardware and software is further described.

Figure 2:
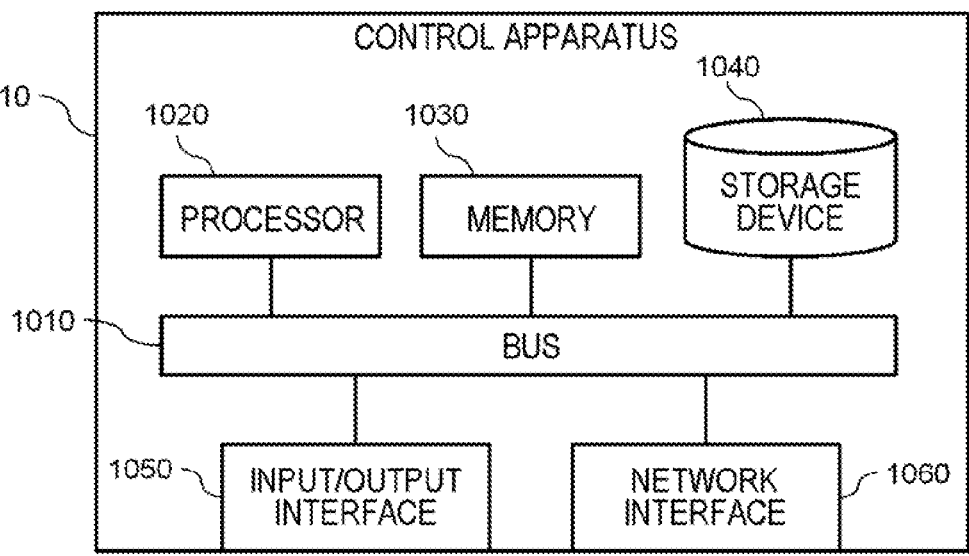
FIG. 2 It is a block diagram illustrating a hardware configuration of a control apparatus.

FIG. 2 is a block diagram illustrating a hardware configuration of the control apparatus 10. The control apparatus 10 includes a bus 1010, a processor 1020, a memory 1030, a storage device 1040, an input/output interface 1050, and a network interface 1060.

The bus 1010 is a data transmission path where the processor 1020, the memory 1030, the storage device 1040, the input/output interface 1050, and the network interface 1060 mutually transmit/receive data. However, a method of connecting the processor 1020 and the like to one another is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores a program module for achieving each function (the decision unit 110, the destination point determination unit 120, the aircraft control unit 130, and the like) of the control apparatus 10. The processor 1020 reads each of the program modules on the memory 1030 and executes the read program module, and thereby each function relevant to each program module is achieved.

The input/output interface 1050 is an interface for connecting the control apparatus 10 and various types of input/output devices to each other. The input/output interface 1050 is connected to various types of sensors, for example, such as an image sensor, an infrared sensor, a gyro sensor, an acceleration sensor, an acoustic wave sensor, an atmospheric pressure sensor, a magnetic azimuth sensor, a temperature sensor, and a global positioning system (GPS) sensor.

The network interface 1060 is an interface for connecting the control apparatus 10 to another apparatus on a network. The network interface 1060 is connected to a communication module for connecting to various types of networks, for example, such as a long term evolution (LTE) network and a 5th generation (5G) network. The control apparatus 10 can communicate with another apparatus connected to a network, by using a communication module connected via the network interface 1060.

Note that, the hardware configuration illustrated in FIG. 2 is merely one example. The hardware configuration of the control apparatus 10 according to the present disclosure is not limited to the example in FIG. 2.

Flow of Processing

Figure 3:
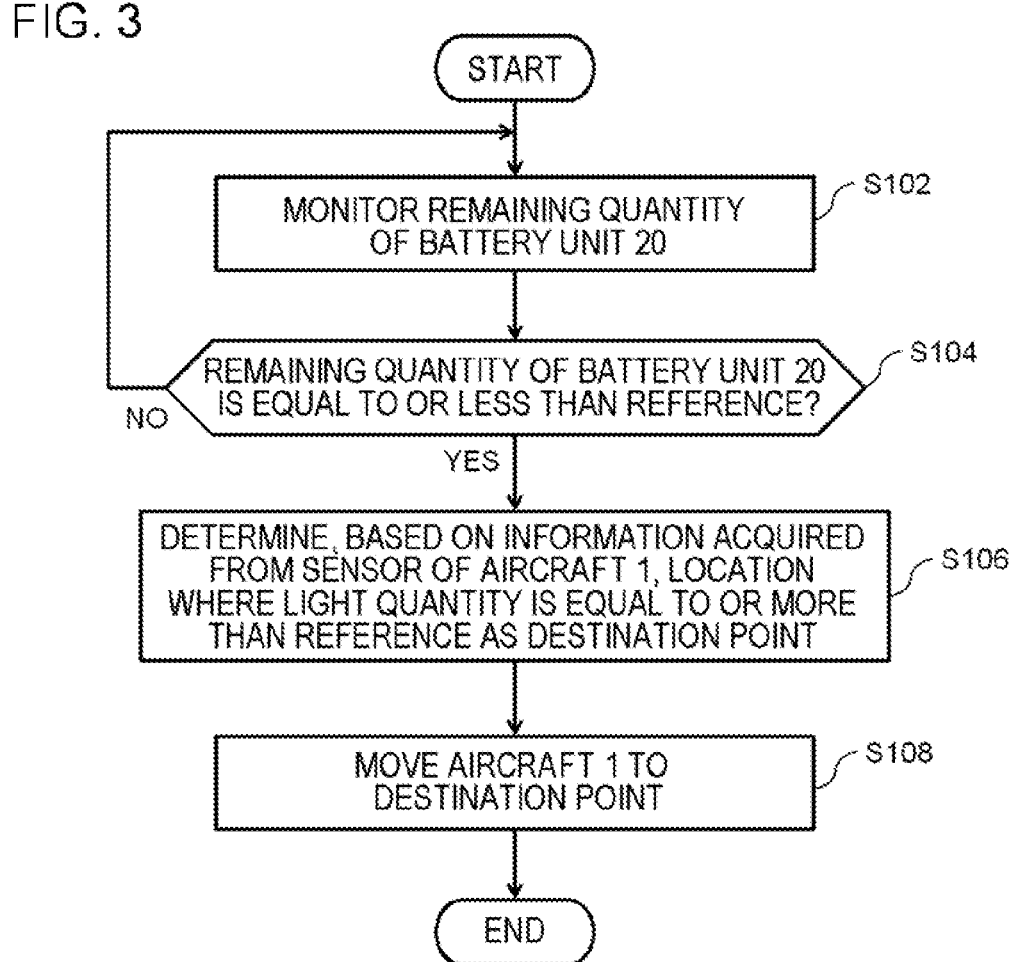
FIG. 3 It is a flowchart illustrating a flow of processing executed by a control apparatus according to a first example embodiment.

By using FIG. 3, a flow of processing executed by the control apparatus according to the present example embodiment is described. FIG. 3 is a flowchart illustrating a flow of processing executed by the control apparatus 10 according to the first example embodiment.

The decision unit 110 executes, when the aircraft 1 starts flying by using the battery 20 as a power source and thereafter during flight using the battery 20 as a power source, processing of monitoring a remaining quantity of the battery unit 20 (S102). Note that, the decision unit 110 can measure a remaining quantity of the battery unit 20, by using a known measurement method, for example, such as a voltage measurement method, a coulomb counter method, a battery cell modeling method, and an impedance track method. Then, the decision unit 110 decides, in processing of monitoring a remaining quantity of the battery unit 20, whether the measured remaining quantity of the battery cell is equal to or less than a reference (S104). Note that, information relating to the reference of a remaining quantity of the battery unit 20 is stored in a storage area of, for example, the memory 1030 or the storage device 1040. In this case, the decision unit 110 reads information relating to the reference from the storage area, and thereby, can compare the read reference with the measured remaining quantity of the battery unit 20.

When it is decided that the remaining quantity of the battery unit 20 exceeds the reference (S104: NO), a return is made to the processing in S102, and processing of monitoring a remaining quantity of the battery unit 20 based on the decision unit 110 is continued during flight using the battery unit 20 as a power source.

On the other hand, when it is decided that the remaining quantity of the battery unit 20 is equal to or less than the reference (S104: YES), the destination point determination unit 120 estimates, by using information of a sensor mounted on the aircraft 1, a location where a light quantity is equal to or more than a reference, and determines the location as a temporary destination point (S106).

Herein, the destination point determination unit 120 can estimate a location exposed to a light quantity equal to or more than the reference, by using, for example, information acquired from an image sensor, information acquired from an infrared sensor, or a combination of these pieces of information. As one example, the destination point determination unit 120 analyzes an image (image data) of the vicinity of a flight location of the aircraft 1 acquired from the image sensor, and acquires information indicating a distribution of brightness in an entire area of the image. Then, the destination point determination unit 120 estimates, based on the information indicating a distribution of brightness in the image, a location relevant to an image area (a set of pixels) having brightness equal to or more than a certain value as a location where a light quantity is equal to or more than the reference. As another example, the destination point determination unit 120 acquires, from the infrared sensor, information indicating a distribution of surface temperatures on a ground surface in the vicinity of a flight location of the aircraft 1. Then, the destination point determination unit 120 estimates, based on the information indicating a distribution of surface temperatures of a ground surface in the vicinity of a flight location, a location relevant to an area where a surface temperature is equal to or more than a certain value as a location where a light quantity is equal to or more than the reference. As further another example, the destination point determination unit 120 analyzes an image acquired from the image sensor, and thereby, identifies a substance on a ground surface in the vicinity of a flight location of the aircraft 1, and acquires, from the infrared sensor, information indicating a distribution of surface temperatures on the ground surface in the vicinity of the flight location of the aircraft 1. Herein, the destination point determination unit 120 can segment, for example, by using a model learned in such a way as to be capable of identifying, based on a known machine learning algorithm, a type of a substance, an image acquired from the image sensor, based on a type (category) of a substance captured in the image. Then, the destination point determination unit 120 estimates a location where a light quantity is equal to or more than a reference, based on a heat balance model according to a type of an identified substance and information of a temperature distribution acquired from the infrared sensor. The destination point determination unit 120, for example, determines a temperature relevant to a certain image area from information of a temperature distribution acquired from the infrared sensor, and estimates, based on the determined temperature and a heat balance model of a substance identified in the image area, a light quantity (intensity of thermal energy) in the image area. Then, the destination point determination unit 120 can estimate, according to whether the estimated light quantity exceeds a predetermined reference, whether a location relevant to the image area is a "location where a light quantity is equal to or more than a reference". Note that, in this case, the image sensor and the infrared sensor are adjusted in such a way that both sensing ranges are substantially completely overlapped, or information indicating an association relation between both sensing ranges is stored in a predetermined storage area (the memory 1030 or the storage device 1040).

In addition, the destination point determination unit 120 may estimate, based on a current flight location of the aircraft 1 and information indicating a flight environment, a location where a light quantity is equal to or more than a reference. In this case, the destination point determination unit 120 operates, for example, as follows. First, the destination point determination unit 120 acquires, by using various types of sensors mounted on the aircraft 1, information indicating a current flight location of the aircraft 1. The destination point determination unit 120 can acquire, as information indicating a current flight location of the aircraft 1, for example, information indicating an estimated location of the aircraft 1 acquired based on self-location estimation processing being executed by using output from various types of sensors during autonomous flight. As self-location estimation processing using various types of sensors, a known technique is usable. Further, when a GPS sensor is mounted on the aircraft 1, the destination point determination unit 120 may acquire, as information indicating a current location of the aircraft 1, GPS information acquired from the GPS sensor. Furthermore, the destination point determination unit 120 acquires, as information indicating a flight environment, map information including information relating to a shape and a height of a planimetric feature and information indicating a current date and time. The map information including information relating to a shape and a height of a planimetric feature is previously stored, for example, in the memory 1030 or the storage device 1040. The destination point determination unit 120 may communicate, via the network interface 1060, with a system that provides map information present on a network, and acquire map information from the system. Further, the destination point determination unit 120 can acquire information indicating a current date and time, from a system clock managed by an operating system (OS) installed in the control apparatus 10 or a hardware clock mounted on a circuit board of the control apparatus 10. Then, the destination point determination unit 120 estimates a way of exposure of sunlight in the vicinity of a location of the aircraft 1, based on a current location of the aircraft 1, information relating to a shape and a height of a planimetric feature located in the surroundings of the location, and information indicating a current date and time. An outline of the operation based on the destination point determination unit 120 is described by using FIG. 4.

FIG. 4 is a diagram illustrating an operation example of the destination point determination unit 120. As illustrated in FIG. 4, the destination point determination unit 120 acquires, based on map information and information indicating a current location of the aircraft 1, map information of the vicinity (e.g., a range of equal to or less than 10 m around the current location of the aircraft 1) of the current location of the aircraft 1. Further, as illustrated, the destination point determination unit 120 estimates, based on information indicating a current date and time, a location of the sun (a direction of light). The information indicating a location of the sun is stored in the memory 1030, the storage device 1040, or the like, for example, in association with information indicating a season and a time period. The destination point determination unit 120 can refer to, based on information of a current date and time, information stored in a storage unit, and acquire information indicating a location of the sun relevant to the current date and time. Then, the destination point determination unit 120 computes, based on information relating to a shape and a height of a planimetric feature F present in the vicinity of a current location of the aircraft 1 and information indicating a location of the sun (a direction of light), a location (an area non-hatched in the figure) exposed to sunlight in the vicinity of the current location of the aircraft 1 and a location (an area hatched by an oblique line in the figure) which is not exposed to sunlight. Then, the destination point determination unit 120 estimates, as a location where a light quantity is equal to or more than a reference, a location exposed to sunlight computed on the map information in this manner, and determines the estimated location as a temporary destination point.

When the temporary destination point is determined by the destination point determination unit 120, the aircraft control unit 130 controls a mechanism relating to a flight operation such as a power motor for the aircraft 1 to move the aircraft 1 to the destination point (S108). The aircraft control unit 130 may cause the aircraft 1 to continue autonomous flight in such a way as to go through an air area relevant to the destination point determined by the destination point determination unit 120, or may cause the aircraft 1 to land on the destination point determined by the destination point determination unit 120. While the aircraft 1 flies on the destination point determined by the destination point determination unit 120, the photovoltaic apparatus 30 generates electric power by using light hitting the destination point. The electric power generated by the photovoltaic apparatus 30 may be used for charging the battery unit 20, or may be used as a temporary power source when a remaining quantity of the battery unit 20 is exhausted.

Note that, in a case in which the aircraft 1 is caused to land on a destination point, the decision unit 110 may be configured in such a way as to monitor a charge state of the battery unit 20 and issues notification to the aircraft control unit 130 when a remaining quantity is equal to or more than a predetermined reference (e.g., 50% of a full charge quantity). In this case, the aircraft control unit 130 controls, according to the notification from the decision unit 110, the mechanism relating to a flight operation of the aircraft 1, and causes the aircraft 1 to restart autonomous flight. Thereafter, the aircraft 1 starts moving toward a location set as an initial destination point.

Exemplification of Advantageous Effect

As described above, according to the present example embodiment, when the aircraft 1 flies by using the battery unit 20 as a power source, a location where a light quantity is equal to or more than a reference is estimated in the surroundings of the aircraft 1 when a remaining quantity of the battery unit 20 is equal to or less than a reference, and thereby the aircraft 1 is controlled in such a way as to move toward the location. Thereby, the photovoltaic apparatus 30 is caused to generate electric power, and thereby electric power required for a mechanism of acquiring a thrust force and a lift force can be covered. Thereby, a problem in that the aircraft 1 cannot generate a sufficient lift force and altitude is lowered, and as a result, an article being delivered is damaged due to contact with a ground surface, a building, or the like can be prevented from occurring.

Second Example Embodiment

There is also an air area where an aircraft should not fly. There may be also a location where air current is unstable according to an environmental element, for example, such as a structure of the surrounding terrain and presence/absence of a building, and therefore, flight is unsuitable. In addition, there is also a location, such as the vicinity of an important facility, where flight of an aircraft is restricted. A control apparatus 10 according to the present example embodiment further includes a function of avoiding such a location where an aircraft is restricted to fly.

Function Configuration Example

The control apparatus 10 according to the present example embodiment includes a configuration (e.g., FIG. 1) similar to the first example embodiment. A destination point determination unit 120 according to the present example embodiment decides, by using information defining a location to be avoided by an aircraft 1 during flight, whether an estimated "location where a light quantity is equal to or more than a reference" as described according to the first example embodiment is suitable as a temporary destination point. Specifically, the destination point determination unit 120 decides, based on information defining a location to be avoided by an aircraft during flight, whether a location estimated as a "location where a light quantity is equal to or more than a reference" and a location to be avoided during flight are overlapped with each other at least partially. Then, when, as a result of the decision, it is decided that the location estimated as a "location where a light quantity is equal to or more than a reference" and the location to be avoided during flight are not overlapped with each other, the destination point determination unit 120 determines the estimated location as a destination point.

The location to be avoided by an aircraft during flight includes, for example, a no-fly zone set by a government, a local government, a police, or the like and a location, such as a neighboring area of a high-rise building, where air current may be unstable (an aircraft cannot stably fly) since wind is strong. Information (hereinafter, referred to also as "flight restriction information") defining such a location as a location to be avoided during flight is previously stored, for example, in the memory 1030 or the storage device 1040. Further, information defining a location to be avoided during flight may be included in map information used when the aircraft 1 autonomously flies. Herein, the flight restriction information includes, with respect to each location set as a location to be avoided during flight, a coordinate value (or a combination of a plurality of coordinate values). The coordinate value (or the combination of a plurality of coordinate values) is defined, for example, as a coordinate value in a coordinate system used when the aircraft 1 autonomously flies.

Flow of Processing

By using FIG. 5, a flow of processing executed by the control apparatus according to the present example embodiment is described. FIG. 5 is a flowchart illustrating a flow of processing of determining a destination point, the processing being executed by the destination point determination unit 120 according to the second example embodiment. FIG. 5 illustrates, in processing of S106 illustrated in the flowchart in FIG. 3, a flow of processing (S1061 to S1065) executed by the destination point determination unit 120 according to the present example embodiment. Hereinafter, pieces of processing of S1061 to S1065 illustrated in FIG. 5 is mainly described.

The destination point determination unit 120 estimates, by using information of various types of sensors mounted on the aircraft 1, a location where a light quantity is equal to or more than a reference in the vicinity of a flight location of the aircraft 1 (S1061). The destination point determination unit 120 can estimate, for example, by using a method as described according to the first example embodiment, the location where a light quantity is equal to or more than a reference. Further, the destination point determination unit 120 acquires flight restriction information stored in the memory 1030 or the storage device 1040, or previously included in map information (S1062).

Then, the destination point determination unit 120 decides whether the location estimated as a "location where a light quantity is equal to or more than a reference" in processing of S1060 and a location defined as a "location to be avoided by an aircraft during flight" by flight restriction information acquired in processing of S1062 are overlapped with each other (S1063). The destination point determination unit 120 can compare, for example, a coordinate value of the location estimated in processing of S1061 with a coordinate value of each location defined by the flight restriction information acquired in processing of S1062, and thereby, determine whether the two locations are overlapped with each other at least partially.

When it is decided that the location estimated as a "location where a light quantity is equal to or more than a reference" and the location defined as a "location to be avoided by an aircraft during flight" are overlapped with each other at least partially (S1063: YES), the destination point determination unit 120 newly estimates a "location where a light quantity is equal to or more than a reference" (S1064). At that time, the destination point determination unit 120 excludes an area relevant to a location estimated once from an area for estimating a "location where a light quantity is equal to or more than a reference" in such a way that a location already estimated in previous processing is not estimated again as a "location where a light quantity is equal to or more than a reference". Thereafter, processing returns to S1063, and decision relating to overlap between a location estimated as a "location where a light quantity is equal to or more than a reference" and a location defined as a "location to be avoided by an aircraft during flight" is executed again.

When it is decided that the location estimated as a "location where a light quantity is equal to or more than a reference" and the location defined as a "location to be avoided by an aircraft during flight" are not overlapped with each other (S1063: NO), the destination point determination unit 120 determines, as a target point, the location estimated as a "location where a light quantity is equal to or more than a reference" (S1065). At that time, the destination point determination unit 120 stores, for example, in the memory 1030 or the like, as a coordinate value of the destination point, a coordinate value of the location estimated as a "location where a light quantity is equal to or more than a reference". Thereafter, the aircraft control unit 130 controls a mechanism relating to a flight operation of the aircraft 1 by using information indicating the coordinate value of the target point to move the aircraft 1 to the target point.

Exemplification of Advantageous Effect

As described above, according to the present example embodiment, when a location estimated as a location where a light quantity is equal to or more than a reference and a location to be avoided by an aircraft during flight are not overlapped with each other, the estimated location is determined as a destination point. Thereby, the aircraft 1 can be prevented, when moving to a location where a light quantity to some extent is expected for power generation of a photovoltaic apparatus 30, from mistakenly intruding into an air area where flight is prohibited or an air area where stable flight is not expected.

While example embodiments of the present invention have been described with reference to the drawings, the present invention should not be interpreted with limitation thereto and can be subjected to various modifications, improvements, and the like, based on knowledge of those of ordinary skill in the art, without departing from the gist of the present invention. Further, a plurality of components disclosed according to the example embodiments are appropriately combined, and thereby, various inventions can be formed. For example, some components may be deleted from all components described according to the example embodiment or components according to different example embodiments may be appropriately combined.

Further, in a plurality of flowcharts used in the above-described description, a plurality of steps (pieces of processing) are described in order, but an execution order of steps executed according to each example embodiment is not limited to the described order. According to each example embodiment, an order of illustrated steps can be modified without posing an obstacle in content. Further, the above-described example embodiments can be combined to the extent that the contents do not conflict.

The whole or part of the example embodiments described above can be described as, but not limited to, the following supplementary notes.

1.

A control apparatus for an aircraft including, as a power source, a battery and a photovoltaic apparatus, the control apparatus including:

a decision unit that decides, when the aircraft flies by using the battery as a power source, whether a remaining quantity of the battery is equal to or less than a reference value;

a destination point determination unit that estimates, when it is decided that the remaining quantity of the battery is equal to or less than the reference value, a location where a light quantity is equal to or more than a reference by using information from a sensor mounted on the aircraft, and determines, as a destination point, the estimated location; and an aircraft control unit that controls a mechanism of the aircraft so as to move the aircraft to the destination point.

2.

The control apparatus according to supplementary note 1, in which the aircraft control unit causes the aircraft to land on the destination point.

3.

The control apparatus according to supplementary note 2, in which the decision unit further decides whether the remaining quantity of the battery exceeds a reference value for flight restart, and the aircraft control unit causes, after the aircraft lands on the destination point and when the remaining quantity of the battery exceeds the reference value for flight restart, the aircraft to restart flying.

4.

The control apparatus according to supplementary note 1, in which the aircraft control unit causes the aircraft to continue flight on a route via an air area of the destination point.

5.

The control apparatus according to any one of supplementary notes 1 to 4, in which the destination point determination unit estimates, by using image data generated by an image sensor mounted on the aircraft as the sensor, the location where the light quantity is equal to or more than the reference.

6.

The control apparatus according to any one of supplementary notes 1 to 5, in which the destination point determination unit acquires, by using the sensor, location information indicating a location of the aircraft, and estimates the location where the light quantity is equal to or more than the reference, based on map information including information relating to a shape and a height of a planimetric feature, information indicating a current date and time, and the acquired location information.

7.

The control apparatus according to any one of supplementary notes 1 to 6, in which the destination point determination unit decides, based on information defining a location to be avoided by the aircraft during flight, whether a location estimated as the location where the light quantity is equal to or more than the reference and the location to be avoided are overlapped with each other at least partially, and

determines the estimated location as the destination point when it is decided that the estimated location and the location to be avoided are not overlapped with each other.

8.

The control apparatus according to supplementary note 7, in which the location to be avoided by the aircraft during flight includes at least any of a location where flight of an aircraft is prohibited and a location where an aircraft cannot stably fly.

9.

An aircraft control method including, by a computer mounted on an aircraft including, as a power source, a battery and a photovoltaic apparatus:

deciding, when the aircraft flies by using the battery as a power source, whether a remaining quantity of the battery is equal to or less than a reference value;

estimating, when it is decided that the remaining quantity of the battery is equal to or less than the reference value, a location where a light quantity is equal to or more than a reference by using information from a sensor mounted on the aircraft, and determining, as a destination point, the estimated location; and controlling a mechanism of the aircraft so as to move the aircraft to the destination point.

10.

The aircraft control method according to supplementary note 9, further including, by the computer, causing the aircraft to land on the destination point.

11.

The aircraft control method according to supplementary note 10, further including, by the computer, deciding whether the remaining quantity of the battery exceeds a reference value for flight restart, in which causing, after the aircraft lands on the destination point and when the remaining quantity of the battery exceeds the reference value for flight restart, the aircraft to restart flying.

12.

The aircraft control method according to supplementary note 9, further including, by the computer, causing the aircraft to continue flight on a route via an air area of the destination point.

13.

The aircraft control method according to any one of supplementary notes 9 to 12, further including, by the computer, estimating, by using image data generated by an image sensor mounted on the aircraft as the sensor, the location where the light quantity is equal to or more than the reference.

14.

The aircraft control method according to any one of supplementary notes 9 to 13, further including, by the computer:

acquiring, by using the sensor, location information indicating a location of the aircraft; and estimating the location where the light quantity is equal to or more than the reference, based on map information including information relating to a shape and a height of a planimetric feature, information indicating a current date and time, and the acquired location information.

13

15.
  The aircraft control method according to any one of supplementary notes 9 to 14, further including,
  by the computer:
    deciding, based on information defining a location to be avoided by the aircraft during flight, whether a location estimated as the location where the light quantity is equal to or more than the reference and the location to be avoided are overlapped with each other at least partially; and
    determining the estimated location as the destination point when it is decided that the estimated location and the location to be avoided are not overlapped with each other.

16.
  The aircraft control method according to supplementary note 15, in which
    the location to be avoided by the aircraft during flight includes at least any of a location where flight of an aircraft is prohibited and a location where an aircraft cannot stably fly.

17.
  A program for causing a computer mounted on an aircraft including, as a power source, a battery and a photovoltaic apparatus to function as:
    a decision unit that decides, when the aircraft flies by using the battery as a power source, whether a remaining quantity of the battery is equal to or less than a reference value;
    a destination point determination unit that estimates, when it is decided that the remaining quantity of the battery is equal to or less than the reference value, a location where a light quantity is equal to or more than a reference by using information from a sensor mounted on the aircraft, and determines, as a destination point, the estimated location; and
    an aircraft control unit that controls a mechanism of the aircraft so as to move the aircraft to the destination point.

18.
  The program according to supplementary note 17, in which
    the aircraft control unit causes the aircraft to land on the destination point.

19.
  The program according to supplementary note 18, in which
    the decision unit further decides whether the remaining quantity of the battery exceeds a reference value for flight restart, and
    the aircraft control unit causes, after the aircraft lands on the destination point and when the remaining quantity of the battery exceeds the reference value for flight restart, the aircraft to restart flying.

20.
  The program according to supplementary note 17, in which
    the aircraft control unit causes the aircraft to continue flight on a route via an air area of the destination point.

21.
  The program according to any one of supplementary notes 17 to 20, in which
    the destination point determination unit estimates, by using image data generated by an image sensor mounted on the aircraft as the sensor, the location where the light quantity is equal to or more than the reference.

14

22.
  The program according to any one of supplementary notes 17 to 21, in which
    the destination point determination unit
      acquires, by using the sensor, location information indicating a location of the aircraft, and
      estimates the location where the light quantity is equal to or more than the reference, based on map information including information relating to a shape and a height of a planimetric feature, information indicating a current date and time, and the acquired location information.

23.
  The program according to any one of supplementary notes 17 to 22, in which
    the destination point determination unit
      decides, based on information defining a location to be avoided by the aircraft during flight, whether a location estimated as the location where the light quantity is equal to or more than the reference and the location to be avoided are overlapped with each other at least partially, and
      determines the estimated location as the destination point when it is decided that the estimated location and the location to be avoided are not overlapped with each other.

24.
  The program according to supplementary note 23, in which
    the location to be avoided by the aircraft during flight includes at least any of a location where flight of an aircraft is prohibited and a location where an aircraft cannot stably fly.

REFERENCE SIGNS LIST

1 Aircraft
10 Control apparatus
1010 Bus
1020 Processor
1030 Memory
1040 Storage device
1050 Input/output interface
1060 Network interface
110 Decision unit
120 Destination point determination unit
130 Aircraft control unit
20 Battery unit
30 Photovoltaic apparatus

What is claimed is:
  1. A control apparatus for an aircraft including, as a power source, a battery and a photovoltaic apparatus, the control apparatus comprising:
    at least one memory configured to store instructions; and
    at least one processor configured to execute the instructions to perform operations, the operations comprising:
    deciding, when the aircraft flies by using the battery as a power source, whether a remaining quantity of the battery is equal to or less than a reference value;
    estimating, when it is decided that the remaining quantity of the battery is equal to or less than the reference value, a target location where a light quantity is equal to or more than a reference by using optical information and thermal information acquired from sensors mounted on the aircraft;

determining the target location as a temporary destination point where light is available for the photovoltaic apparatus to generate electric power; and controlling a mechanism of the aircraft so as to move the aircraft to the temporary destination point, wherein the estimating the target location comprises:

determining a temperature relevant to an image area based on the thermal information, identifying a type of substance present in the image area based on the optical information, and estimating the target location based on the determined temperature and a heat balance model corresponding to the identified type of substance.

2. The control apparatus according to claim 1, wherein the operations further comprise causing the aircraft to land on the temporary destination point.

3. The control apparatus according to claim 2, wherein the operations further comprise:

deciding whether the remaining quantity of the battery exceeds a reference value for flight restart, and causing, after the aircraft lands on the temporary destination point and when the remaining quantity of the battery exceeds the reference value for flight restart, the aircraft to restart flying.

4. The control apparatus according to claim 1, wherein the operations further comprise causing the aircraft to continue flight on a route by using at least the electric power generated when the aircraft is flying in spatial regions corresponding to the temporary destination point.

5. The control apparatus according to claim 1, wherein the operations further comprise estimating, by using image data, as the optical information, generated by an image sensor among the sensors mounted on the aircraft, the location where the light quantity is equal to or more than the reference.

6. The control apparatus according to claim 1, wherein the operations further comprise:

acquiring, by using the sensors, location information indicating a location of the aircraft, and estimating the location where the light quantity is equal to or more than the reference, based on map information including information relating to a shape and a height of a planimetric feature, information indicating a current date and time, and the acquired location information.

7. The control apparatus according to claim 1, wherein the operations further comprise:

deciding, based on information defining a location to be avoided by the aircraft during flight, whether a location estimated as the target location where the light quantity is equal to or more than the reference and the location to be avoided are overlapped with each other at least partially, and determining the target location as the temporary destination point when it is decided that the target location and the location to be avoided are not overlapped with each other.

8. The control apparatus according to claim 7, wherein the location to be avoided by the aircraft during flight includes at least any of a location where flight of an aircraft is prohibited and a location where an aircraft cannot stably fly.

9. An aircraft control method comprising, by a computer mounted on an aircraft including, as a power source, a battery and a photovoltaic apparatus:

deciding, when the aircraft flies by using the battery as a power source, whether a remaining quantity of the battery is equal to or less than a reference value;

estimating, when it is decided that the remaining quantity of the battery is equal to or less than the reference value, a target location where a light quantity is equal to or more than a reference by using optical information and thermal information acquired from sensors mounted on the aircraft;

determining the target location as a temporary destination point where light is available for the photovoltaic apparatus to generate electric power; and controlling a mechanism of the aircraft so as to move the aircraft to the temporary destination point, wherein the estimating the target location comprises:

determining a temperature relevant to an image area based on the thermal information, identifying a type of substance present in the image area based on the optical information, and estimating the target location based on the determined temperature and a heat balance model corresponding to the identified type of substance.

10. A non-transitory computer-readable medium storing a program for causing a computer mounted on an aircraft including, as a power source, a battery and a photovoltaic apparatus to perform operations, the operations comprising:

deciding, when the aircraft flies by using the battery as a power source, whether a remaining quantity of the battery is equal to or less than a reference value;

estimating, when it is decided that the remaining quantity of the battery is equal to or less than the reference value, a target location where a light quantity is equal to or more than a reference by using optical information and thermal information acquired from sensors mounted on the aircraft;

determining the target location as a temporary destination point where light is available for the photovoltaic apparatus to generate electric power; and controlling a mechanism of the aircraft so as to move the aircraft to the temporary destination point, wherein the estimating the target location comprises:

determining a temperature relevant to an image area based on the thermal information, identifying a type of substance present in the image area based on the optical information, and estimating the target location based on the determined temperature and a heat balance model corresponding to the identified type of substance.

* * * * *